UNITED STATES PATENT OFFICE.

THOMAS BROOKS, OF CANTON, OHIO.

IMPROVEMENT IN THE MANUFACTURE OF STEEL.

Specification forming part of Letters Patent No. 135,768, dated February 11, 1873.

*To all whom it may concern:*

Be it known that I, THOMAS BROOKS, of Canton, in the county of Stark and State of Ohio, have invented a new and useful Improvement in Process for Converting Iron into Steel, of which the following is a full, clear, and exact description.

The invention consists in the employment of a new chemical compound in the manufacture of steel by the smelting process, the object of my invention being to produce a grade of high-tool-steel which shall weld without the aid of fluxes or other welding compounds.

In my new process I use tungsten, spiegeleisen, charcoal, and black oxide of manganese, in substantially the proportions and manner hereinafter stated.

I prefer to use the Swedish bar iron as being of very uniform quality and free from impurities; and to every seventy-four pounds of iron I take fourteen ounces of tungsten, fourteen ounces of spiegeleisen, eight ounces of charcoal, and half an ounce of manganese. The materials are placed in a smelting-furnace and subjected to substantially the treatment usually employed in the production of steel by that method.

Steel made in the manner and by the ingredients above set forth will be tough, malleable; will weld firmly without the use of fluxes; and will take clean sharp edges for tools; and will also work into springs of great elasticity and durability.

I am aware that each and all of the above-named ingredients have been employed in the manufacture of steel; hence I do not wish to claim the use of them separately; neither do I wish to be limited to the exact proportions given, as they may be varied slightly, and yet produce satisfactory results.

I am aware that spiegeleisen and tungsten have been employed in varying quantities in the manufacture of steel, and that in some of Mushet's patents processes are described in which, by varying the proportion within the limit described, and by assuming that in the compound selected the speigeleisen shall contain certain quantities of manganese and carbon, a compound may be made which will correspond very nearly with the formula employed by me. But there is this material difference between the Mushet process and mine. I use wrought-iron having a fibrous organization or texture, and produce a steel which will weld perfectly without the use of fluxes, while Mushet uses cast-iron which has been decarbonized, or partly decarbonized, by means of currents of air, and gives no intimation that his product will weld without fluxes; on the contrary, his steel resembles very closely that made by the Bessemer process, and which welds with great difficulty, even with fluxes.

Having thus described my invention, what I claim as new, and desire to secure by Letters Patent, is—

The herein-described compound of tungsten, manganese, and charcoal, when used substantially in the proportions and manner set forth, for the conversion of wrought or bar iron into steel.

In testimony whereof I have hereunto set my hand this 12th day of July, A. D. 1872.

THOMAS BROOKS.

Witnesses:
P. POWERS,
GEO. W. RAFF.